United States Patent [19]

Lin

[11] Patent Number: 5,914,791

[45] Date of Patent: Jun. 22, 1999

[54] STRUCTURE OF SCANNER HAVING SELECTOR SWITCH TURNED BETWEEN PLATFORM SCAN MODE AND AUTOMATIC DOCUMENT FEEDER SCAN MODE

[75] Inventor: Jim Lin, Hsin-Chu, Taiwan

[73] Assignee: Tamarack Technologies Inc., Taipei, Taiwan

[21] Appl. No.: 08/859,420

[22] Filed: May 20, 1997

[51] Int. Cl.[6] ...................................................... H04N 1/04
[52] U.S. Cl. .......................... 358/498; 358/474; 358/496; 358/497
[58] Field of Search ..................................... 358/498, 496, 358/497, 474, 471, 494, 401, 501, 505, 296, 468, 488, 408; 271/3.01, 3.14; 399/85, 263, 379, 380; 355/18

[56] References Cited

U.S. PATENT DOCUMENTS 4,264,188  4/1981  Tomosada et al. ......................... 399/85
4,922,292  5/1990  Watanabe ................................. 399/380
5,543,893  8/1996  Sheldon ................................... 358/498

*Primary Examiner*—Edward L. Coles
*Assistant Examiner*—Cheukfan Lee

[57] ABSTRACT

A scanner providing the function of an automatic document feeder type scanner and the function of a platform type scanner which includes a platform housing, a lift cover pivoted to the platform housing, an automatic document feeder pivoted to the lift cover and having a feeding slot covered with a dust cover, and a selector switch turned between a platform scan mode and an automatic document feeder scan mode, wherein when the selector switch is switched to the automatic document feeder scan mode, the lift cover is disengaged from the automatic document feeder and the automatic document feeder is retained to the platform housing, permitting the dust cover to be lifted with the lift cover for feeding paper; when the selector switch is switched to the platform scan mode, the automatic document feeder is engaged with the lift cover and disengaged from the platform housing and can be lifted with the lift cover from the platform housing.

4 Claims, 5 Drawing Sheets

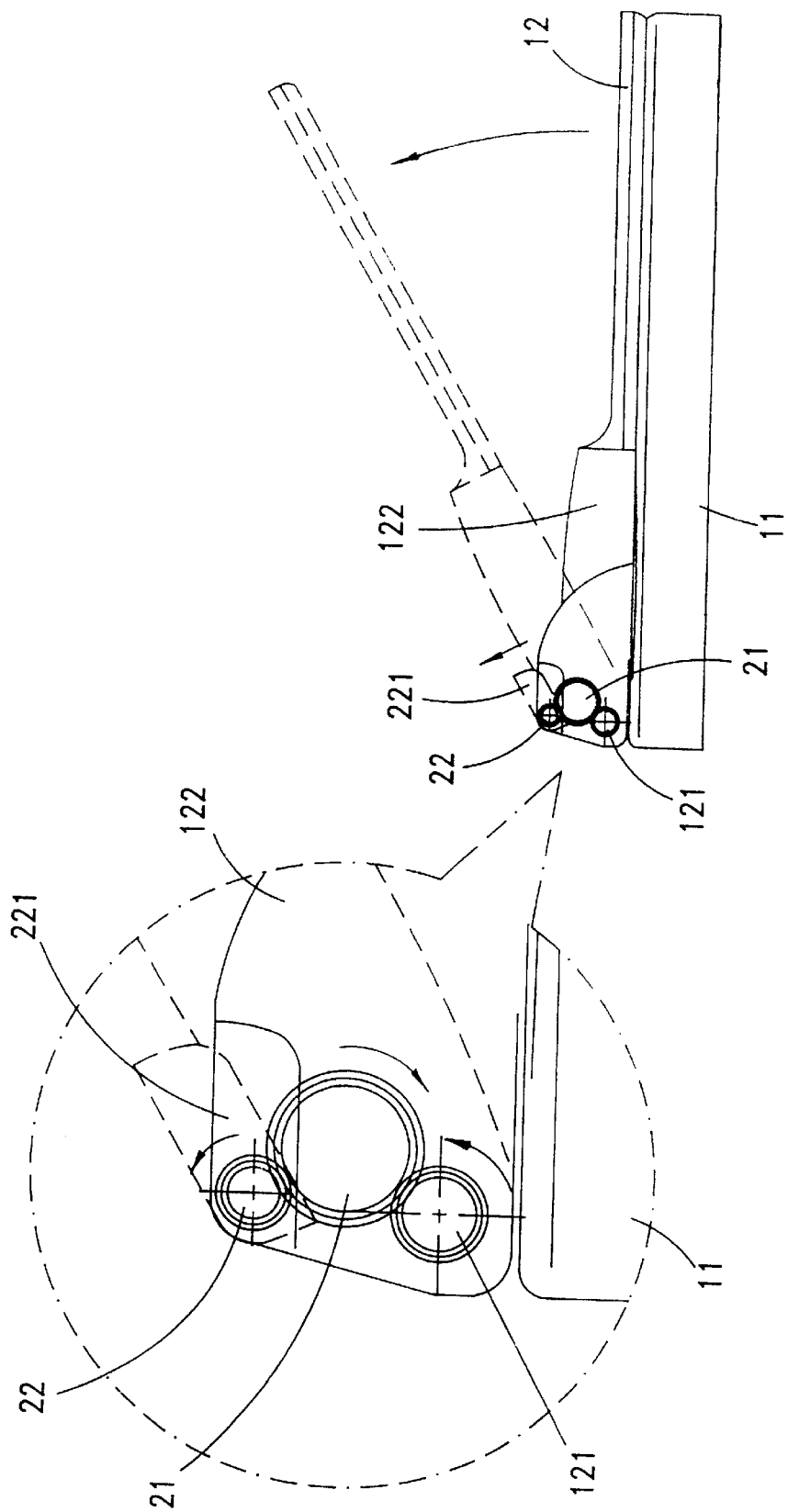

STRUCTURE OF SCANNER HAVING SELECTOR SWITCH TURNED BETWEEN PLATFORM SCAN MODE AND AUTOMATIC DOCUMENT FEEDER SCAN MODE

BACKGROUND OF THE INVENTION

The present invention relates to scanners, and more particularly to a scanner which combines an automatic document feeder type scanner and a platform type scanner into a compact unit.

A variety of scanners have been disclosed, and have appeared on the market. These scanners can be gathered into two groups, namely, the platform type and the vertical type. A vertical type scanner occupies less table space, and is convenient to carry. However, a vertical type scanner must be equipped with an automatic document feeder. There are also known dual-mode scanners which combine a platform type scanner and a vertical type scanner into a compact unit. However, because the image sensor is mounted inside the platform housing below the glass and the automatic document feeder is mounted at the top of the platform housing above the glass, the automatic document feeder occupies a part of the scanning area of the platform housing. Therefore these dual-mode scanners allow only one single piece of paper to be loaded in the automatic document feeder. The automatic document feeder of a dual-mode scanner has a dust cover that can be opened for supporting a piece of paper in the feeding slot. However, the limited size of the dust cover cannot stably support the fed piece of paper in position.

SUMMARY OF THE INVENTION

It is one object of the present invention to provide a scanner which provides the function of an automatic document feeder type scanner and the function of a platform type scanner. It is another object of the present invention to provide a dual-mode scanner which is practical for scanning reflective document as well as penetrative document. It is still another object of the present invention to provide a scanner which permits a jammed paper to be directly pulled out of the internal mechanism. It is still another object of the present invention to provide a dual-mode scanner which permits a number of pieces of paper to be automatically fed in continuously piece by piece. It is still another object of the present invention to provide an automatic document feeder for a dual-mode scanner which does not occupies the scanning area of the scanner during the platform scan mode. According to one aspect of the present invention, the scanner comprises a platform housing, a lift cover pivoted to the platform housing, an automatic document feeder pivoted to the lift cover and having a feeding slot covered with a dust cover, and a selector switch turned between a platform scan mode and an automatic document feeder scan mode, wherein when the selector switch is switched to the automatic document feeder scan mode, the lift cover is disengaged from the automatic document feeder and the automatic document feeder is retained to the platform housing, permitting the dust cover to be lifted with the lift cover for feeding paper; when the selector switch is switched to the platform scan mode, the automatic document feeder is engaged with the lift cover and disengaged from the platform housing and can be lifted with the lift cover from the platform housing. According to another aspect of the present invention, the automatic document feeder comprises a transmission mechanism controlled to feed paper, the transmission mechanism comprising a motor having an output shaft, an internal gear, a pinion fixedly mounted around the output shaft of the motor and meshed with the internal gear, a center gear fixedly fastened to one side of the internal gear at its center, a feeding gear meshed with the center gear, a feeding roller coupled to the feeding gear by an one-way bearing and turned to deliver fed-in paper, a dispensing gear meshed with the feeding gear, and a dispensing roller coupled to the dispensing gear by an one-way bearing and turned to dispense paper.

BRIEF DESCRIPTION OF THE DRAWINGS

FIG. 2 is a side plain view of the present invention, showing the turning direction of the lift cover;

FIG. 2A is an enlarged view of a part of FIG. 2;

DETAILED DESCRIPTION OF THE PREFERRED EMBODIMENT

Figures 1, 1A:
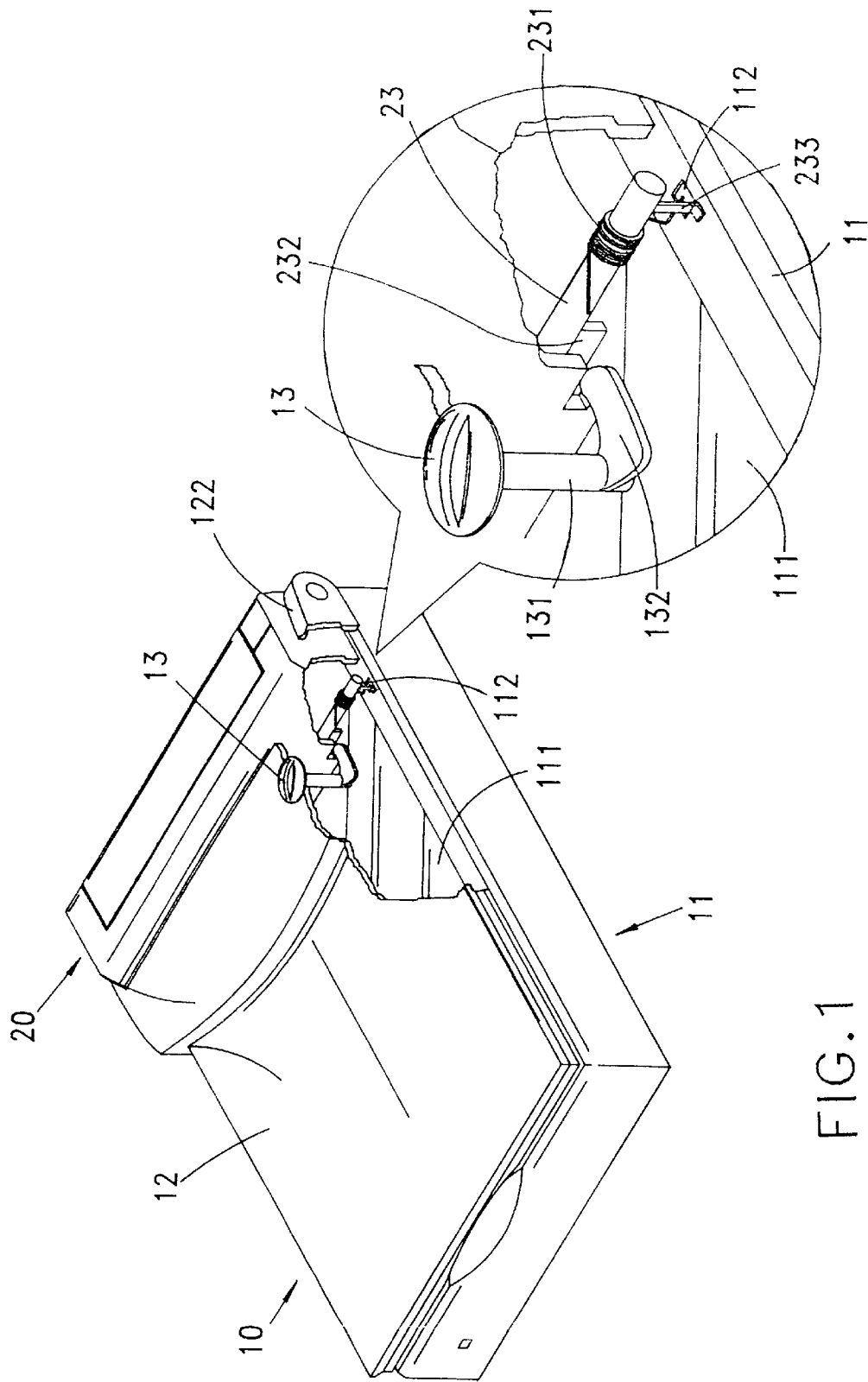
FIG. 1 is a cutaway of a scanner according to the present invention.
FIG. 1A is an enlarged view of a part of FIG. 1.
Figure 3:
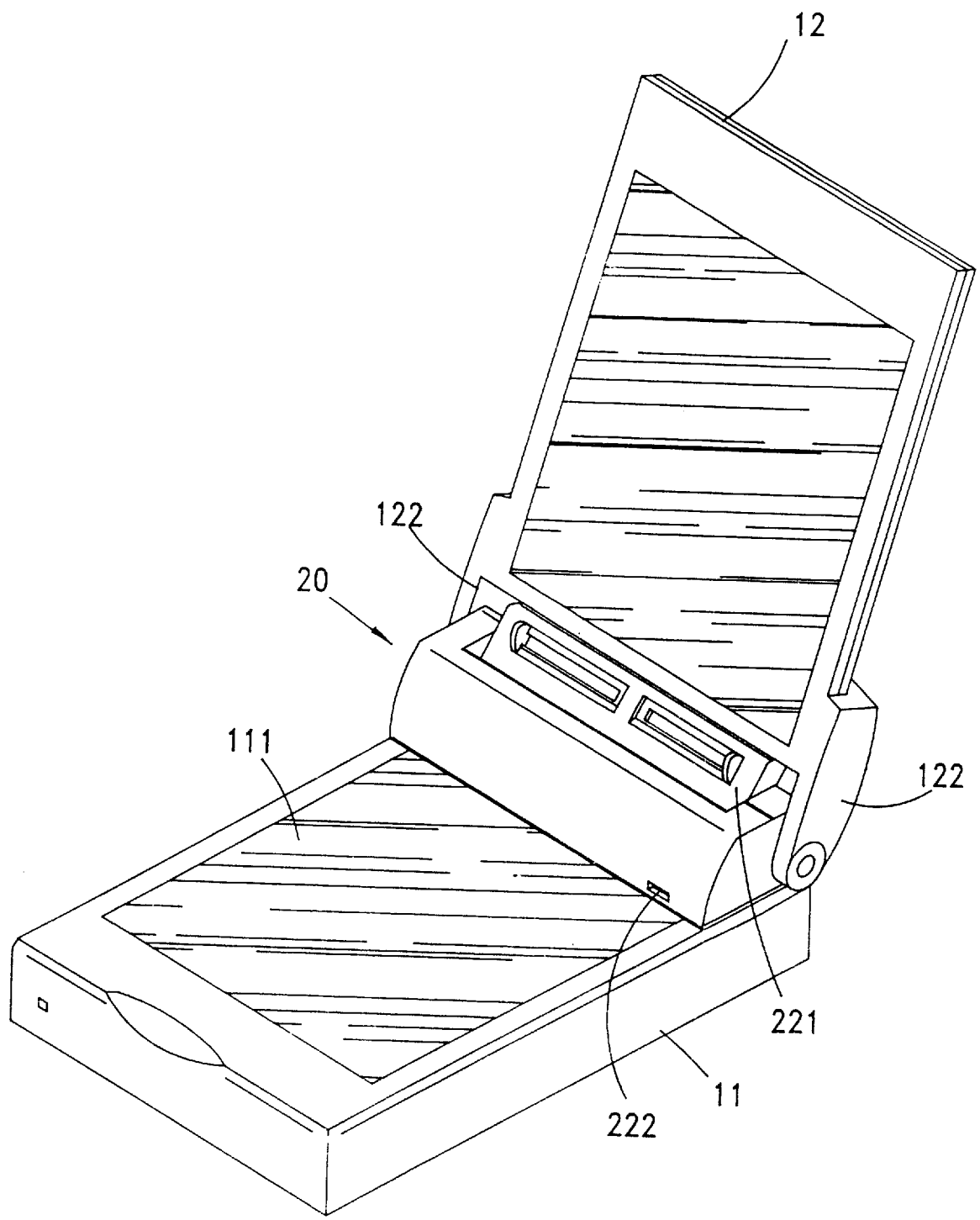
FIG. 3 is an elevational view of the present invention, showing the lift cover lifted.
Figure 4:
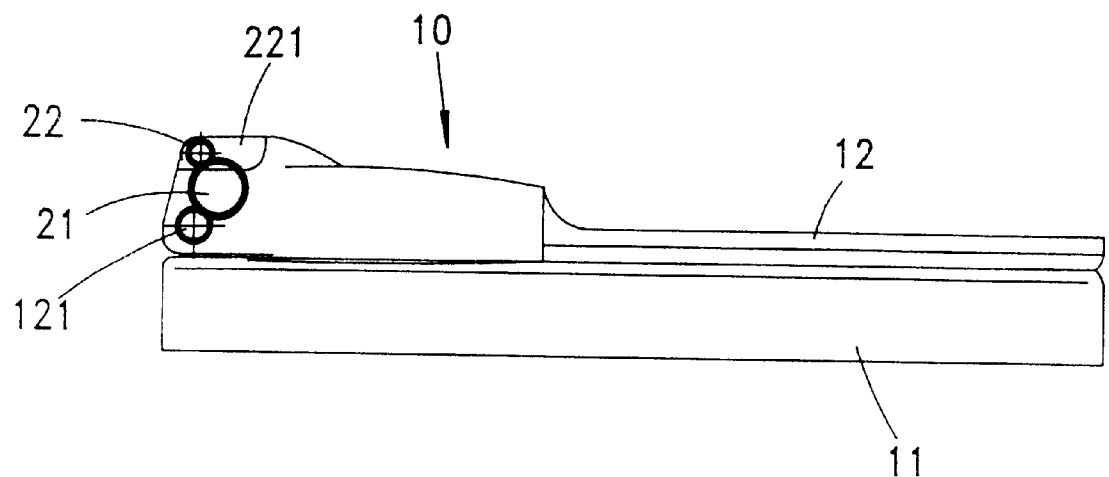
FIG. 4 is another side plain view of the present invention, showing the lift cover closed.
Figure 4A:
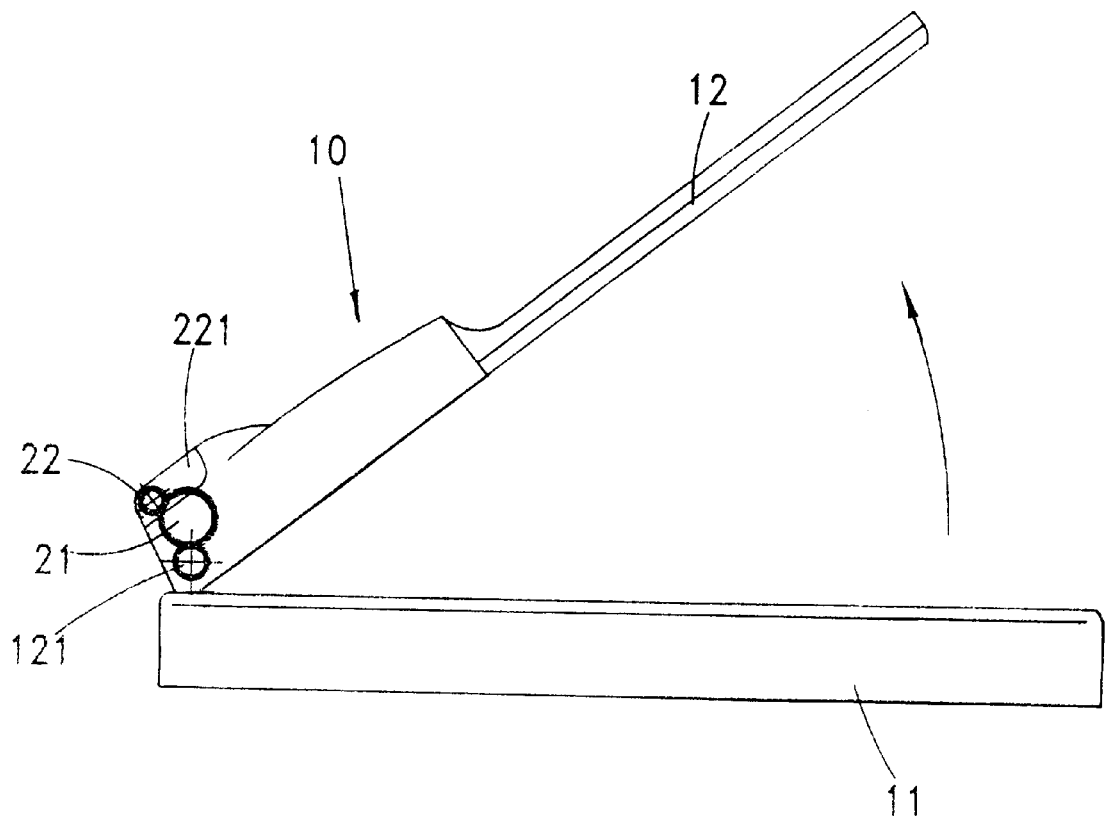
FIG. 4A is still another side plain view of the present invention, showing the lift cover and the automatic document feeder lifted from the platform housing.

Referring to FIGS. from 1 to 4, a scanner 10 in accordance with the present invention combines an automatic document feeder type scanner and a platform type scanner into one unit, comprising a platform housing 11 having a glass 111 at its top side on which document is put for scanning. The glass 111 has two side notches 112 bilaterally disposed near its rear side. A lift cover 12 is pivoted to the platform housing 11 at its top side, having two pivot arms 122; 122' adapted to turn about a main pivot 121, a glass 123 at an inner side and a light source (not shown) inside the glass 123 for scanning penetrative document (positive picture, negative picture, slide, x-ray film, etc.). An ADF (automatic document feeder) 20 is turned about a second pivot 21 between the pivot arms 122;122'. A dust cover 221 is turned about a third pivot 22 in the automatic document feeder 20. The second and third pivots 21;22 and the main pivot 121 are arranged in parallel, and the second pivot 21 is meshed between the third pivot 22 and the main pivot 121. The lift cover 12 comprises a selector switch 13 for PLATFORM/ADF scan mode selection control. The selector switch 13 comprises a rod 131 and an actuating plate 132 fastened to the rod 131. The actuating plate 132 is turned with the rod 131 of the selector switch 13 to move a stop plate 232 in a hole 222 in the ADF 20. The stop plate 232 is fixedly connected to an axle 23 in the ADF 20. Two hooks 233 are mounted on two opposite ends of the axle 23 and adapted for hooking in the side notches 112 of the glass 111 of the platform housing 11. Two spring members 231 are winded round the axle 23 and respectively connected between the stop plate 232 and the hooks 233, and controlled by the actuating plate 132 to force the hooks 233 out of the side notches 112, for permitting the ADF 20 to be released from the platform housing 11 and turned with the lift cover 12 (see FIGS. 4 and 4A). When the ADF 20 is lifted with the lift cover 12 from the platform housing 11, the effective scanning area of the platform housing 11 is relatively increased (up to A4 size).

When the selector switch 13 is switched to the PLATFORM scan mode, the actuating plate 132 is released from the stop plate 232, the spring members 231 immediately force the hooks 233 into engagement with the side notches 112 of the glass 111 of the platform housing 11. At this condition, the ADF 20 is disengaged from the lift cover 12 and secured to the platform housing 11. Simultaneously, the second pivot 21 of the ADF 20 is turned by the main pivot 121 to turn the third pivot 22 and the dust cover 221. Therefore, the lift cover 12 and the dust cover 221 are synchronously opened (see FIGS. 2 and 2A), and the lift cover 12 is served as an extension back board for supporting documents ready to feed.

Figure 5:
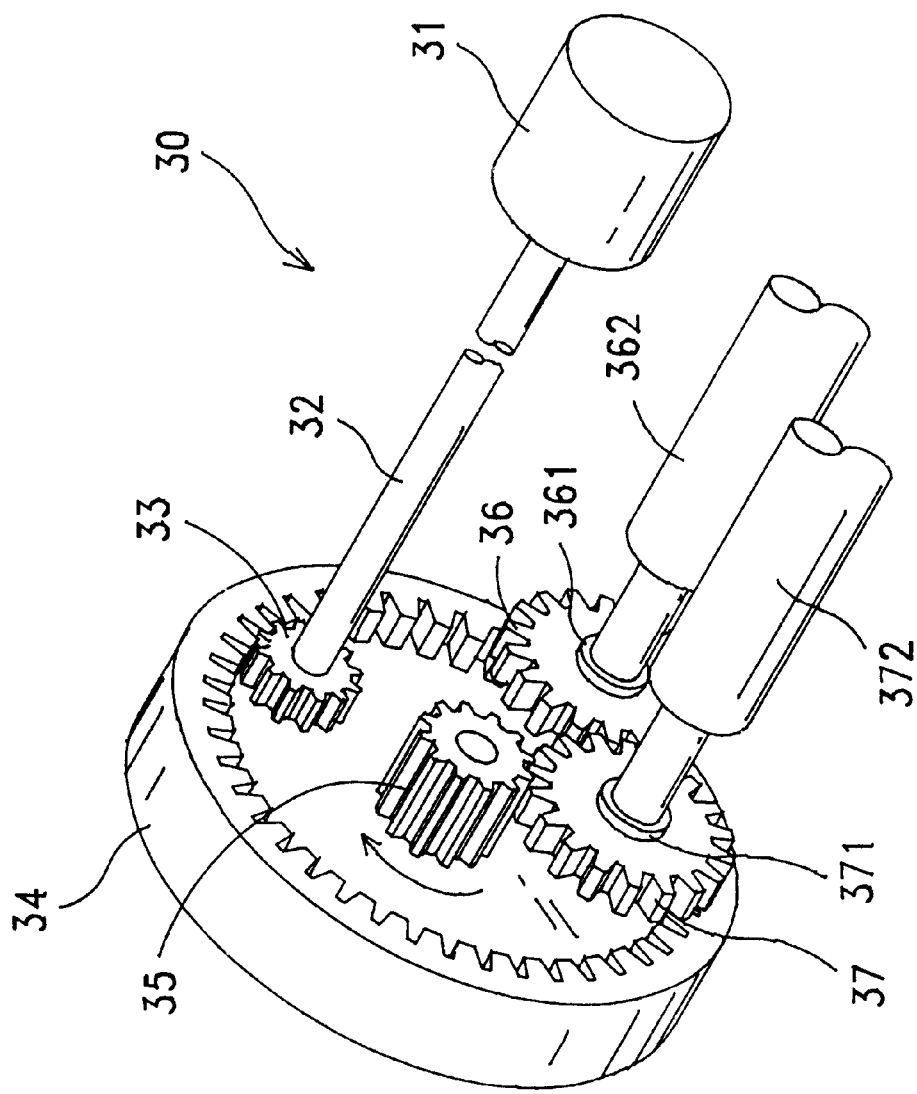
FIG. 5 is an elevational view of the transmission mechanism according to the present invention.

Referring to FIG. 5, the ADF 20 comprises a transmission mechanism 30 controlled to feed document. The transmission mechanism 30 comprises a motor 31 having an output shaft 32, an internal gear 34, a pinion 33 fixedly mounted around the output shaft 32 of the motor 31 and meshed with the internal gear 34, a center gear 35 fixedly fastened to the center of the internal gear 34 at one side, a feeding gear 37 meshed with the center gear 35, a feeding roller 372 coupled to the feeding gear 37 by an one-way bearing 371 and turned to deliver fed-in paper, a dispensing gear 36 meshed with the feeding gear 37, and a dispensing roller 362 coupled to the dispensing gear 36 by an one-way bearing 361 and turned to dispense paper. When driving power is disappeared, the dispensing roller 362 and the feeding roller 372 can be turned backwards freely with the gears 36, 37 staid still. Therefore, a jammed piece of paper can be directly pulled out of the transmission mechanism 30.

While only one embodiment of the present invention has been shown and described, it will be understood that various modifications and changes could be made thereunto without departing from the spirit and scope of the invention disclosed.

What the invention claimed is:

1. A scanner comprising:

a platform housing having a glass at a top side thereof on which document is put for scanning, and a main pivot transversely disposed at its top side, said glass having two side notches bilaterally disposed near a rear side thereof;

a lift cover pivoted to said platform housing, having two pivot arms adapted to turn about said main pivot, a second pivot and a third pivot connected between said pivot arms;

an automatic document feeder turned about said second pivot of said lift cover, said automatic document feeder comprising a feeding slot and a dust cover covered on said feeding slot and turned about said third pivot of said lift cover; and a selector switch control mechanism mounted on said platform housing and turned between a platform scan mode and an automatic document feeder scan mode to control the engagement between said lift cover and said automatic document feeder and said platform housing;

wherein when said selector switch is switched to said automatic document feeder scan mode, said lift cover is disengaged from said automatic document feeder and said automatic document feeder is retained to said platform housing, permitting said dust cover to be lifted with said lift cover for feeding paper; when said selector switch is switched to said platform scan mode, said automatic document feeder is engaged with said lift cover and disengaged from said platform housing, and can be lifted with said lift cover from said platform housing.

2. The scanner of claim 1 wherein said selector switch control mechanism comprises a rod, an actuating plate fastened to said rod and turned to push a stop plate, an axle mounted inside said automatic document feeder, a stop plate fixedly connected to said axle, two hooks mounted on two opposite ends of said axle and respectively forced into engagement with the side notches of said platform housing, two spring members respectively connected between said stop plate and said hooks, said stop plate being pushed by said actuating plate to force said hooks out of the side notches of said platform housing, for permitting said automatic document feeder to be released from said platform housing and turned with said lift cover.

3. The scanner of claim 1 wherein said lift cover comprises a glass, and a light source mounted on an inside and controlled to project light through its glass for scanning penetrative document.

4. The scanner of claim 1 wherein said automatic document feeder comprises a transmission mechanism controlled to feed paper, said transmission mechanism comprising a motor having an output shaft, an internal gear, a pinion fixedly mounted around said output shaft of said motor and meshed with said internal gear, a center gear fixedly fastened to one side of said internal gear at its center, a feeding gear meshed with said center gear, a feeding roller coupled to said feeding gear by an one-way bearing and turned to deliver fed-in paper, a dispensing gear meshed with said feeding gear, and a dispensing roller coupled to said dispensing gear by an one-way bearing and turned to dispense paper.

* * * * *